United States Patent
Bortoli et al.

(10) Patent No.: US 10,099,772 B2
(45) Date of Patent: Oct. 16, 2018

(54) ICE-SHEDDING SPINNER FOR RAM AIR TURBINE

(71) Applicant: HAMILTON SUNDSTRAND CORPORATION, Charlotte, NC (US)

(72) Inventors: Stephen Michael Bortoli, Roscoe, IL (US); Geoffrey D. Fenelon, Rockford, IL (US); William E. Seidel, Rockford, IL (US); Alan J. Fahrner, Canton, OH (US); Michael John Giamati, Akron, OH (US); Gregory C. Hopkins, Caledonia, IL (US); Mark Walter Corcoran, Rockford, IL (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 435 days.

(21) Appl. No.: 14/530,180

(22) Filed: Oct. 31, 2014

(65) Prior Publication Data
US 2016/0122034 A1    May 5, 2016

(51) Int. Cl.
*F01D 25/02* (2006.01)
*B64C 11/14* (2006.01)
(Continued)

(52) U.S. Cl.
CPC ............ *B64C 11/14* (2013.01); *B64D 41/007* (2013.01); *F01D 5/025* (2013.01); *F01D 5/288* (2013.01); *F01D 15/10* (2013.01); *F01D 25/02* (2013.01); *F02C 7/047* (2013.01); *F05D 2220/34* (2013.01); *F05D 2230/90* (2013.01); *F05D 2250/232* (2013.01); *F05D 2300/43* (2013.01); *F05D 2300/501* (2013.01);
(Continued)

(58) Field of Classification Search
CPC ........ F03D 1/0691; F01D 25/02; F01D 15/10; F05D 22/24; F05D 2300/512; F05D 2220/34; F05D 2230/90; B64C 11/14; B64D 41/007
See application file for complete search history.

(56) References Cited

U.S. PATENT DOCUMENTS

| 3,633,411 A | 1/1972 | Hann et al. |
| 4,129,984 A * | 12/1978 | Nelson ............... F02C 7/047 137/15.1 |

(Continued)

FOREIGN PATENT DOCUMENTS

EP    3088734 A1    11/2016

OTHER PUBLICATIONS

French Search Report; International Application No. 1560396; International Filing Date: Oct. 30, 2015; dated May 30, 2017; 8 pages.

*Primary Examiner* — Ninh H Nguyen
(74) *Attorney, Agent, or Firm* — Cantor Colburn LLP

(57) ABSTRACT

A ram air turbine movable between a stowed position and a deployed position is provided including a rotatable hub assembly. A hub face is arranged at a first end of the rotatable hub assembly. The hub face has a non-planar configuration such that a limited portion of a surface area of the hub face is arranged within a plane oriented perpendicular to a direction of travel of an airflow upstream from the hub face when the ram air turbine is in a deployed position.

9 Claims, 5 Drawing Sheets

(51) Int. Cl.
  *F01D 15/10* (2006.01)
  *B64D 41/00* (2006.01)
  *F01D 5/28* (2006.01)
  *F01D 5/02* (2006.01)
  *F02C 7/047* (2006.01)

(52) U.S. Cl.
  CPC ....... *F05D 2300/512* (2013.01); *Y02T 50/671* (2013.01); *Y02T 50/673* (2013.01)

(56) References Cited

U.S. PATENT DOCUMENTS

| | | | | |
|---|---|---|---|---|
| 4,393,650 | A * | 7/1983 | Pool | F02C 7/047 416/132 R |
| 4,578,019 | A * | 3/1986 | Safarik | B64C 11/34 416/1 |
| 5,746,580 | A * | 5/1998 | Parker | B64D 41/007 416/245 A |
| 6,439,505 | B1 * | 8/2002 | Hyde | B64D 15/166 244/134 A |
| 7,077,631 | B2 * | 7/2006 | Eccles | B64D 41/007 244/58 |
| 8,920,119 | B2 * | 12/2014 | Bannon | F02C 7/32 416/140 |
| 8,984,855 | B2 * | 3/2015 | Delapierre | F02C 6/206 137/15.1 |
| 2007/0160460 | A1 | 7/2007 | Eccles et al. | |
| 2012/0134844 | A1 * | 5/2012 | Bottome | F02C 7/04 416/245 R |
| 2013/0255277 | A1 * | 10/2013 | Macchia | F02C 7/04 60/805 |

\* cited by examiner

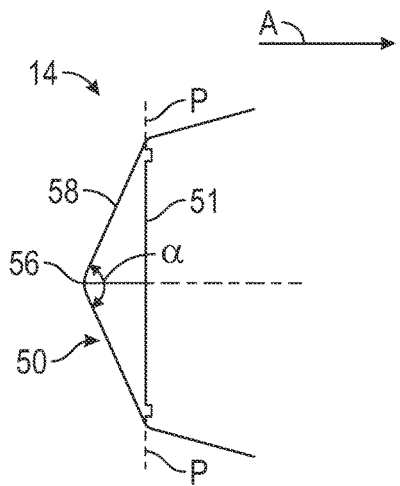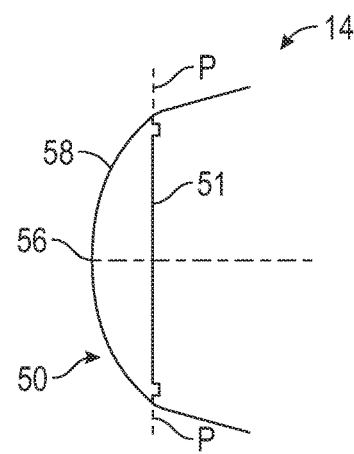
FIG. 3D  FIG. 3E
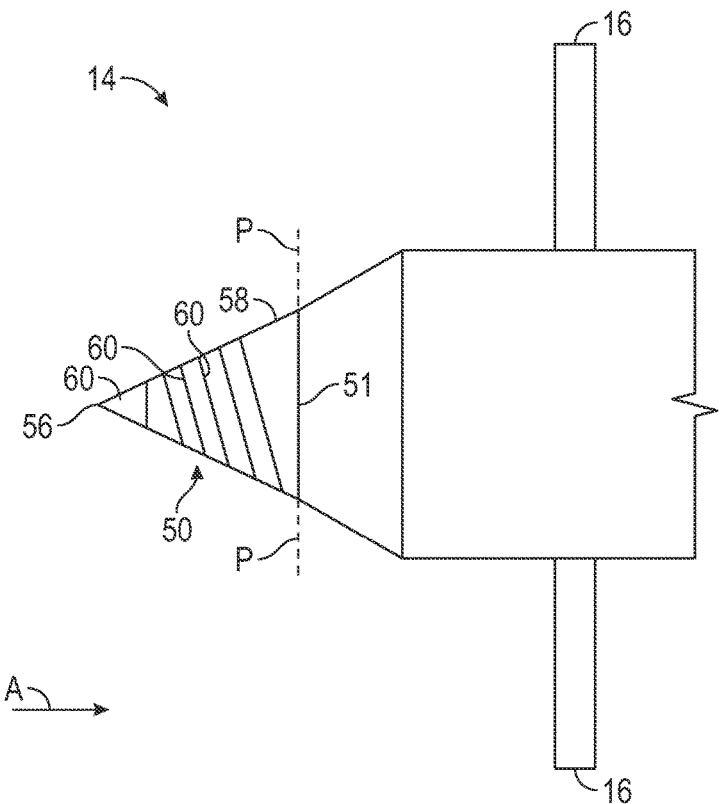
FIG. 4

ICE-SHEDDING SPINNER FOR RAM AIR TURBINE

BACKGROUND OF THE INVENTION

Exemplary embodiments of this invention generally relate to emergency power supplies for aeronautical applications, and more particularly, to an improved ram air turbine assembly for generating emergency power for an aircraft in flight.

Aircrafts include, as standard equipment, a back-up power source for use in times of power outage in the main power system. The back-up equipment is stowed in a stowage bay within the fuselage or wing root of the aircraft. One example of such back-up equipment is a ram air turbine (RAT). During an emergency event, such as power loss for example, the RAT can be deployed into the airstream where the passing air relative to the speed of the aircraft causes the turbine blades of the back-up equipment to rotate. A RAT may generate hydraulic power, electric power, or both. The turbine is coupled to suitable power generating equipment, such as a hydraulic pump for hydraulic power, or an electric generator for electric power, or both in the case of a hybrid RAT.

When the RAT is deployed during adverse ambient flight conditions, ice may form and accumulate on the RAT causing degraded component or system performance. In addition, loosened pieces of the accumulated ice pose a risk of becoming entrained in the air flow and causing further damage to any of the RAT components arranged in the downstream path of the flying ice fragments.

BRIEF DESCRIPTION OF THE INVENTION

According to one embodiment of the invention, a ram air turbine movable between a stowed position and a deployed position is provided including a rotatable hub assembly. A hub face is arranged at a first end of the rotatable hub assembly. The hub face has a non-planar configuration such that a limited portion of a surface area of the hub face is arranged within a plane oriented perpendicular to a direction of travel of an airflow upstream from the hub face when the ram air turbine is in a deployed position.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 3a-3e are cross-sectional views of various hub faces of a rotatable hub assembly of a RAT according to an embodiment of the invention;

FIG. 4 is a side view of a portion of a rotatable hub assembly of a RAT according to an embodiment of the invention.

The detailed description explains embodiments of the invention, together with advantages and features, by way of example with reference to the drawings.

DETAILED DESCRIPTION OF THE INVENTION

Figure 1:
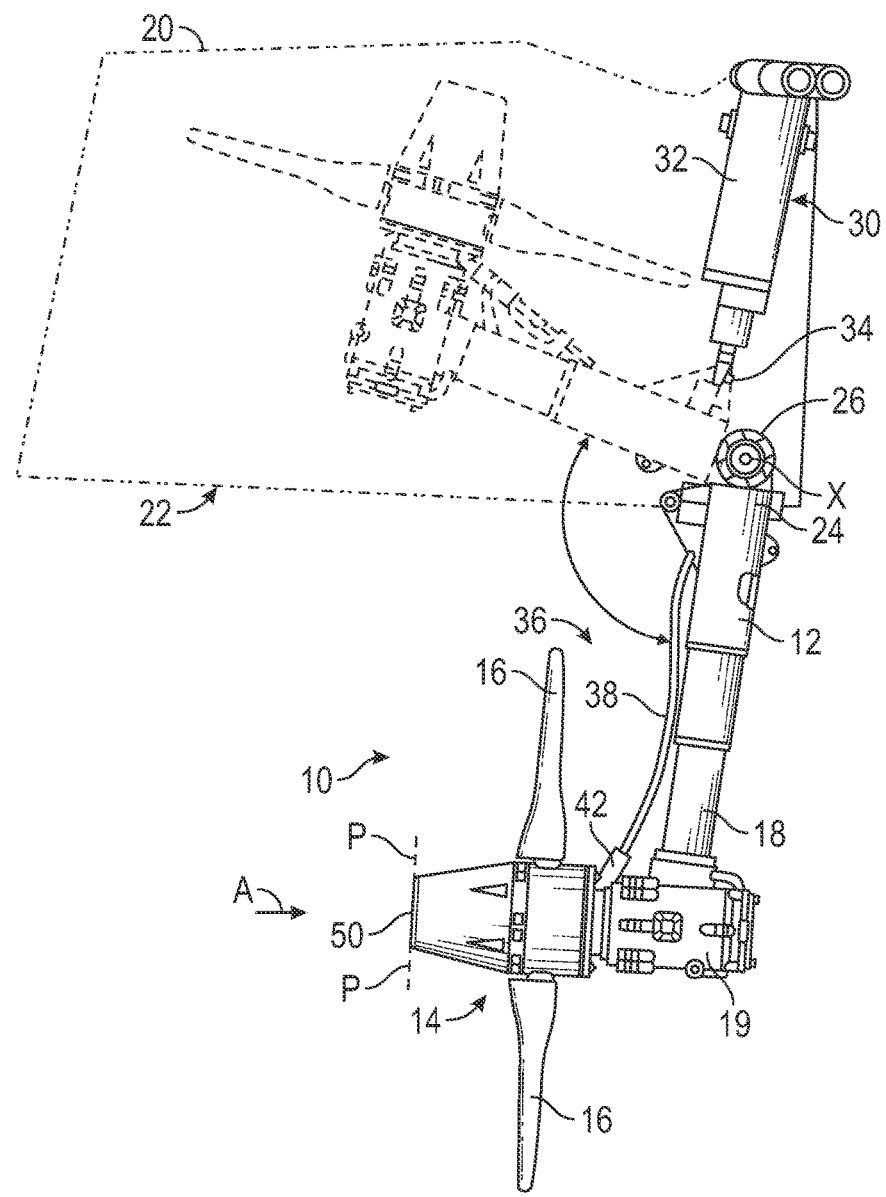
FIG. 1 is a schematic diagram of an example of a ram air turbine (RAT) of an aircraft.
Figure 2:
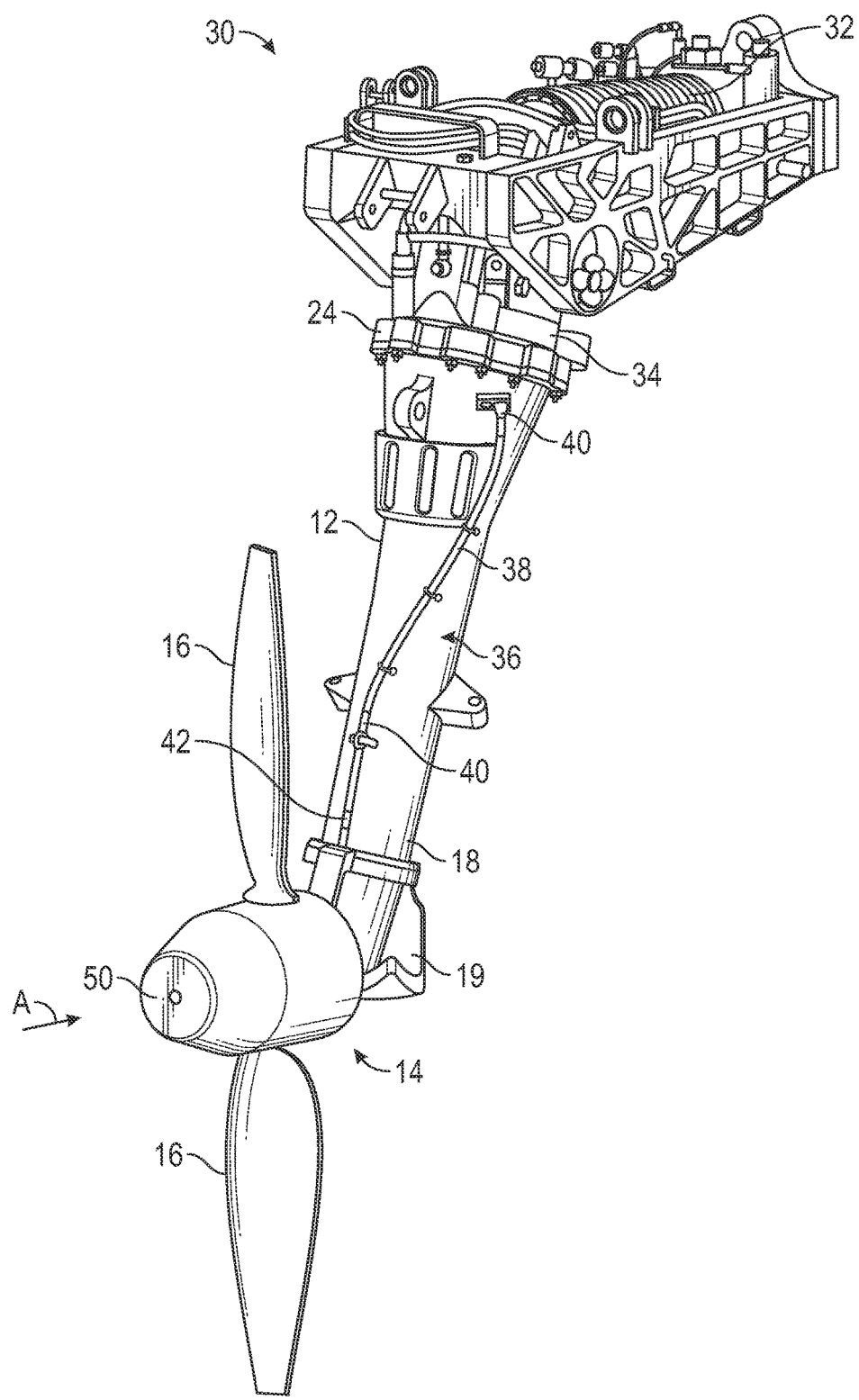
FIG. 2 is a perspective view of a RAT according to an embodiment of the invention.

Referring now to the FIGS. 1 and 2, an exemplary ram air turbine (RAT) 10 having an associated deployment mechanism including a strut 12 is illustrated. The RAT 10 has a rotatable hub assembly 14 with two or more blades 16 configured to impart rotation to the rotatable hub assembly 14 when exposed to an airstream indicated by arrow A. A first end 18 of the strut 12 is attached to a housing 19 which rotatably mounts a drive shaft (not shown) fixed to the rotatable hub assembly 14. Rotation is imparted to the drive shaft when the rotatable hub assembly 14 rotates.

The RAT 10 is intended for emergency use as a drive for power-generating means and has a stowed, inactive position, illustrated in broken lines, and a deployed, active position, illustrated in solid lines. In the stowed position, the RAT 10 is stowed within a compartment 22 interiorly of an aircraft fuselage 20, with the outline of the both the aircraft fuselage 20 and the compartment 22 being illustrated schematically in broken lines. In the deployed position, the RAT 10 is moved out of the compartment 22 to a position where the blades 16 are free to rotate without interference from the aircraft fuselage 20 or compartment 22.

The second, opposite end 24 of the strut 12 is mounted to a frame such that the strut 12 is configured to pivot about a pivot axis X which is the axis of rotation of a shaft 26, to move the RAT 10 between the stowed and deployed positions. In the illustrated, non-limiting embodiment, the deployment mechanism 30 includes an actuator 32 in the form of a spring-loaded hydraulic cylinder having a first end 34 attached to the strut 12. A locking mechanism (not shown) may be included and configured to hold the RAT 10 in the stowed position and can be manually or automatically moved to free the RAT 10 for movement to the deployed position. Once unlocked, the deployment mechanism 30, as well as gravity, causes the RAT 10 to move from the stowed position to the deployed position.

Due to the restrictive size of the compartment 22, the blades 16 are held in a predetermined rotative position by an indexing mechanism 36 when the RAT 10 is in the stowed position. As shown, the indexing mechanism 36 includes an elongate cable 38 supported for lengthwise movement by a pair of aperture brackets 40 fixed to the strut 12. The end 42 of the cable 38 adjacent the hub assembly 14 includes a detent pin (not shown) configured to extend through an aperture and lock the blades 16 in a predetermined position. During transition from the stowed position to the deployed position, the strut 12 rotates about the pivot axis X thereby applying a force to the cable 38 causing the detent pin to separate from the corresponding aperture.

A hub face 50 is arranged at the foremost portion of the rotatably hub assembly 14 such that a base 51 of the hub face 50 is mounted in a plane P substantially perpendicular to the direction of travel of an adjacent airflow, indicated by arrow A (see FIGS. 3a-e). As is illustrated in FIG. 2, the hub face 50 of the rotatable hub assembly 14 has a generally flat surface arranged in contact with airflow A. With reference now to FIGS. 3a-3e, the shape or contour of the hub face 50 has been modified to minimize the surface area of the hub face 50 arranged perpendicular to the direction of the travel of the airflow A according to an embodiment of the invention. By reducing the surface of the hub face 50 oriented generally perpendicular to the airstream, the amount of ice accumulated thereon when the RAT 10 is deployed in adverse ambient flight conditions is minimized.

Figure 3A:
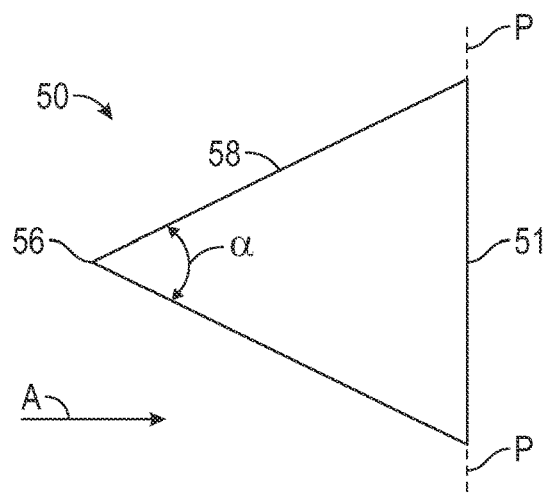
Figure 3B:
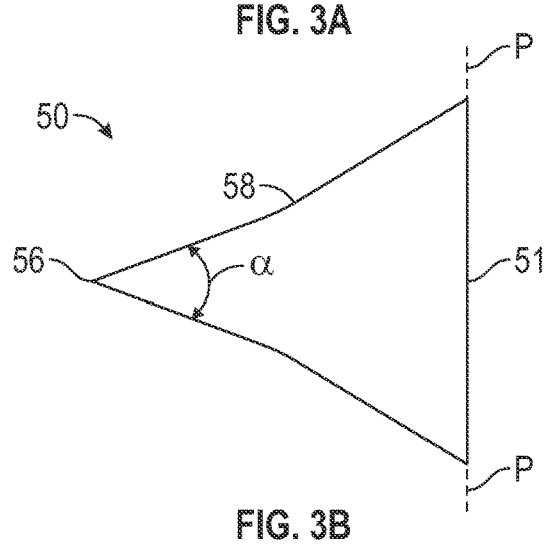
Figure 3C:
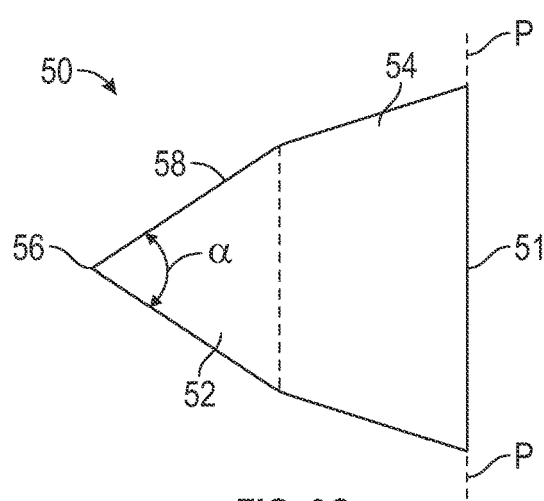

The hub face 50 may include any of a variety of shapes configured to improve the aerodynamic capabilities of the RAT 10 while retaining the features that cause self-shedding of any ice accumulated thereon. In one embodiment, as illustrated in FIGS. 3a and 3d, the hub face 50 may have a simple conical shape of varying proportions. In another embodiment, the hub face 50 may have a frustoconical shape (FIG. 3b) having two adjacent conical sections with varying angles. Alternatively, the hub face 50 may have a generally "coniptical" shape, as illustrated in FIG. 3c. A coniptical shape includes a first conical section 52 having a substantially round cross-section, and a second section 54 having a substantially elliptical cross-section. In such embodiments, the first section 52 may extend over any portion of the axial length of the hub face 50, such as 50% for example. In embodiments where the hub face 50 has a generally angular shape, such as in FIGS. 3a-3d for example, the angle α of the upstream portion 56 of the hub face 50 configured to contact the airstream may vary from 30° to 60°. Ice shedding is generally maximized when the angle α is about 45°. However, as a result of the restrictive size envelope of compartment 22, a compromise between efficient ice shedding and overall aerodynamic performance may be necessary to properly implement certain shapes, such as the "coniptical" shape for example. In yet another embodiment, illustrated in FIG. 3e, the hub face 50 has a generally rounded, convex shape.

An ice-phobic surface treatment or coating may be applied to at least a portion of the exposed outer surface 58 of the hub face 50. Exemplary ice-phobic coatings may be based on silicone-oil-infused polydimethylsiloxane (PDMS) compounds, epoxy-silicone blends, fluoro-modified polyesters, urethanes, or other suitable compositions. The ice-phobic coating is configured not only to prevent ice formation, but also to repel small water droplets at subzero temperatures, such as from rain, fog, or sleet for example. Prevention of the accumulation and coagulation of such small water-laden droplets leads to successful anti-icing of the desired surface 58.

Alternatively, or in addition to the ice-phobic coating, a light weight elastomeric material may be applied to the hub face 50 to assist in the shedding of ice formed thereon, as shown in FIGS. 4 and 5. Examples of lightweight elastomeric materials include neoprene, rubber and viton, in addition to any other suitable materials. The elastomeric material is flexible under the load of the ice. As a result, the elastomeric material will deform or "twist" due to the centrifugal forces acting as a result of rotation, thereby breaking the bonds formed between the surface of the elastomeric material and any accumulated ice. In one embodiment, elastomeric material 60 is applied to the upstream portion or tip 56 of the hub face 50 configured to initially contact an airstream indicated by arrow A. Because ice does not accumulate symmetrically on deforming rotating surfaces, ice can be easily shed off from the bending/twisting of the rubber tip.

Figure 5A:
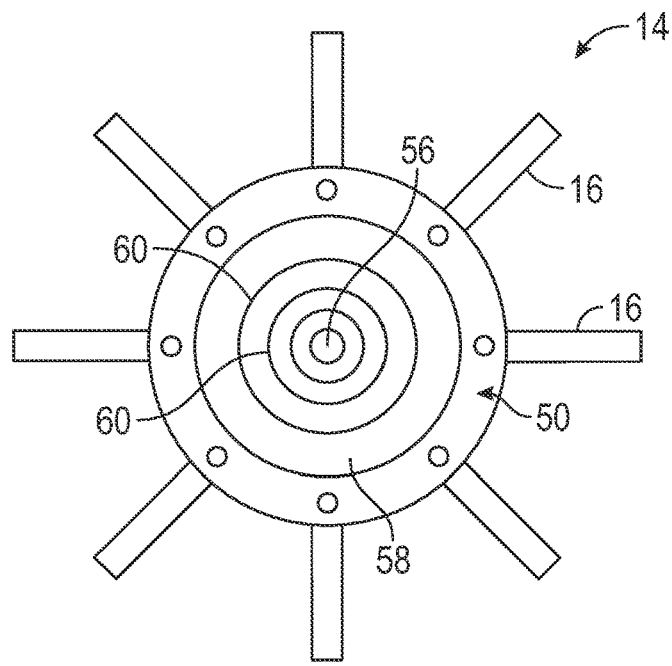
FIGS. 5A and 5B are front views of a rotatable hub assembly of a RAT according to an embodiment of the invention.
Figure 5B:
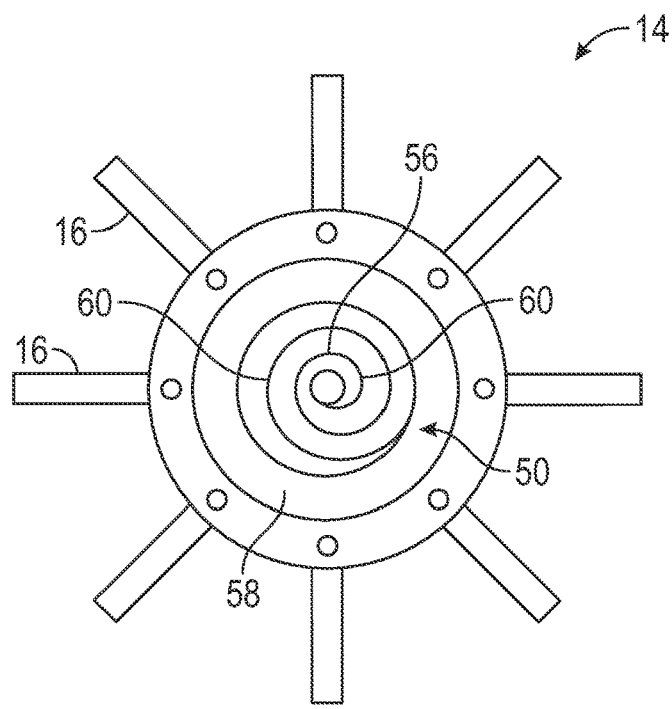

Alternatively, or in addition, thin strips of elastomeric material 60 can be added about the surface 58 of the hub face exposed to the airstream A to form stress risers into any ice accumulated thereon. The elastomeric material 60 is positioned about the hub face 50 in a relatively close arrangement to limit the size of the pieces of ice formed between adjacent stress risers. In combination with the aerodynamic drag from the airstream, these stress risers are intended to cause the ice accumulated thereon to break more easily. In addition, the strips of elastomeric material 60 are generally positioned about the hub face 50 in a symmetrical arrangement to maintain balanced rotation of the hub assembly 14. For example, the elastomeric strips 60 may be arranged in concentric circles, as shown in FIG. 5a, or alternatively, the elastomeric strips 60 may be arranged in a spiral configuration extending from the upstream portion or tip 56 as shown in FIG. 5b. Other arrangements of the elastomeric material 60 configured such that any accumulated ice fractures into small pieces are also within the scope of the invention.

By altering the contour of the hub assembly 50 of the RAT 10 to reduce the surface area thereof exposed to an airstream, the amount of ice accumulation on the RAT 10 is reduced and ice is more effectively shed by rotation of the hub assembly 14. Since the accumulated ice is less, any potential ice debris breaking off the spinning hub may pose minimal risk of damaging any of the RAT's downstream components and sub-systems. As a result, the RAT 10 no longer requires an electrical heater in the region of hub face 50 or surface 58 to melt the ice accumulated thereon. However, the RAT 10 disclosed herein may be used in conjunction with one or more heaters. In addition, the ice particles shed from the hub face 50 are small and because the centrifugal force acting on the particles is high, the particles are ejected a further distance and therefore have a reduced likelihood of damaging downstream components of the RAT 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A ram air turbine movable between a stowed and deployed position, comprising:
   a rotatable hub assembly;
   a hub face arranged at a first end of the rotatable hub assembly, the hub face having a non-planar configuration such that a limited portion of a surface area of the hub face is arranged within a plane oriented perpendicular to a direction of travel of an airflow upstream from the hub face when the ram air turbine is in the deployed position, the hub face having a tip disposed at a central axis of the hub assembly at the upstream extent of the hub face, the tip defined by a first included angle of the hub face of between 30 degrees and 60 degrees a first hub face portion extending downstream from the tip, a second portion extending downstream from the first portion, the second portion defined by a second included angle greater than the first included angle;
   a strut having a first strut end secured to the rotatable hub and a second strut end opposite the first end pivotably secured to a frame, such that pivoting the strut relative to the frame moves the ram air turbine between the stowed position and the deployed position; and a plurality of elastomeric strips applied to the hub face configured to induce stress risers in ice accumulated thereon, the plurality of elastomeric strips arranged in concentric circles.

2. The ram air turbine according to claim 1, wherein the hub face has an angular shape.

3. The ram air turbine according to claim 2, wherein an angle of the upstream portion of the hub face configured to contact the airstream is between 30° and 60°.

4. The ram air turbine according to claim 2, wherein the hub face has a conical shape.

5. The ram air turbine according to claim 2, wherein the hub face has a coniptical shape.

6. The ram air turbine according to claim 1, wherein the hub face has a rounded, convex shape.

7. The ram air turbine according to claim 1, wherein an ice-phobic coating is applied over the hub face to minimize accumulation of ice thereon.

8. The ram air turbine according to claim 1, wherein the elastomeric material is applied to an upstream end of the hub face.

9. The ram air turbine according to claim 1, wherein the elastomeric material is wrapped symmetrically about an exposed surface of the hub face.

\* \* \* \* \*